(12) United States Patent
Peterson et al.

(10) Patent No.: US 6,534,608 B2
(45) Date of Patent: Mar. 18, 2003

(54) SUPPORT MATERIALS FOR USE WITH POLYMERIZATION CATALYSTS

(75) Inventors: Thomas Henry Peterson, Charleston, WV (US); Dick Alan Nagaki, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 61 days.

(21) Appl. No.: 09/731,639

(22) Filed: Dec. 7, 2000

(65) Prior Publication Data

US 2002/0115803 A1 Aug. 22, 2002

(51) Int. Cl.$^7$ .................................................. C08F 4/42
(52) U.S. Cl. ...................... 526/160; 526/161; 526/943; 526/170; 526/177; 526/348; 502/152; 502/180; 502/418
(58) Field of Search ................................. 526/160, 161, 526/943, 170, 177, 348; 502/152, 180, 418

(56) References Cited

U.S. PATENT DOCUMENTS 5,580,697 A * 12/1996 Keana et al. ............... 430/296

FOREIGN PATENT DOCUMENTS

| GB | 2 001 662 | * | 2/1979 |
| WO | WO 94/03506 | * | 2/1994 |

* cited by examiner

*Primary Examiner*—David W. Wu
*Assistant Examiner*—Ling-Siu Choi
(74) *Attorney, Agent, or Firm*—Lisa Kimes Jones

(57) ABSTRACT

The invention provides new olefin(s) polymerization catalyst systems, including graphite support. The invention also provides methods of preparing the catalyst system, and to the catalyst system's use in a gas or slurry polymerization process upon scan exposure.

19 Claims, No Drawings

SUPPORT MATERIALS FOR USE WITH POLYMERIZATION CATALYSTS

FIELD OF THE INVENTION

The present invention relates generally to the field of new support materials for use with polymerization catalysts. In particular, the present invention is directed to new catalyst systems comprising a graphite support material and a polymerization catalyst compound, to methods for preparing these supported catalyst systems, and their use in the polymerization of olefin(s).

BACKGROUND OF THE INVENTION

Developments in polymerization technology have provided more efficient, highly productive and economically enhanced catalyst systems and processes. Especially illustrative of these advances is the development of bulky ligand metallocene catalysts and of Group 15 metal containing catalysts. To utilize these catalyst compounds in industrial slurry or gas phases processes, it is useful that they be immobilized on a support or carrier.

The use of supported or heterogeneous catalysts in gas and slurry phase polymerization is important as a means of increasing process efficiencies by assuring that the forming polymeric particles achieve shape and density that improves reactor operability and ease of handling. Ineffective catalyst supports permit the production of polymeric fines and fouling of reactor walls or piping. This appears to be due to a number of possible reasons, including premature support particle fragmentation or catalyst desorption, both of which can lead to decrease in the control of polymerization. Polymer particle size and density can be degraded and efficiencies lost.

Typical heterogeneous catalyst systems include inorganic oxide supports, such as $SiO_2$, $Al_2O_3$ and $MgO$. These inorganic oxide supports, which may be used in concert with a catalyst activator compound, are available in a variety of particle sizes and porosities. However, silica and other inorganic oxide supports have several deficiencies. For example, the presence of water on the surface of inorganic oxide supports is known in the art to be a catalyst poison adversely affecting catalyst activity. To remove water from the surface, inorganic oxide supports must be calcined at high temperatures or chemically treated with appropriate reagents. In addition, inorganic oxides also readily adsorb other commonly occurring catalyst poisons, such as oxygen.

Moreover, with the emergence of discrete single-sited catalysts, research has shown that the use of such supports leads to a great deterioration of catalyst activity, often leading to prohibitively high catalyst costs in commercial applications. Further, certain catalysts bearing reactive functionalities (e.g., newer catalyst compounds and/or non-coordinating anions) are largely or entirely inactive when deposited on silica supports.

Where conventional Ziegler-Natta catalysts have been successfully prepared employing conventional silica (and other) support materials, experience continues to show that discrete metallocene and metallocene-type catalysts suffer significant activity losses when common supports are used. For catalysts that incorporate inexpensive precursors and display very high activities, such losses may be acceptable for commercial operation. However, for many catalysts, deterioration of catalytic activity through the use of conventional supporting materials can lead to prohibitively high catalyst costs, precluding their use from commercial applications. This is especially true for catalysts that possess metal to nitrogen and metal to oxygen bonds, or which employ non-coordinating anions for charge balance. It is likely that the activity losses observed upon supporting these catalysts arise from deleterious interactions of these sensitive species with Lewis basic and/or hydroxylic sites on the support.

Graphite is a very soft mineral consisting of carbon having a layered structure that consists of six carbon atoms arranged in widely spaced horizontal sheets. Graphite is typically used in pencils, lubricants, crucibles, foundry facings and polishes.

There exists a need for improved catalyst systems utilizing new support materials, for methods of preparing catalyst systems utilizing new support materials and for a polymerization process utilizing such supported catalyst systems. It is therefore an object of this invention to identify support materials that preserve both the activity and the polymer properties of "unsupportable" catalysts, in the sense of traditional support materials, that will also perform in existing or minimally-modified commercial catalyst feeding configurations. It is also an object of this invention to use several simple and commercially-available materials as supports for catalysts for use in polyolefin polymerization environments where the catalysts activity in solution, which is usually greater than when the catalyst is supported, is retained.

SUMMARY OF THE INVENTION

This invention provides a new catalyst system including graphite support materials, a catalyst compound and an activator compound, to methods of preparing the new catalyst system and to its use in the polymerization of olefin(s).

DETAILED DESCRIPTION OF THE INVENTION

Introduction

The catalyst compounds which may be utilized in the graphite supported catalyst systems of invention include bulky ligand metallocene catalyst compounds and Group 15 containing metal compounds.

Bulky Ligand Metallocene Catalyst Compounds

Graphite support materials may be utilized with the bulky ligand metallocene polymerization catalyst compounds described below. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom. In one preferred embodiment, at least one bulky ligands is $\eta$-bonded to the metal atom, most preferably $\eta^5$-bonded to a transition metal atom.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the graphite support materials may be utilized with the bulky ligand metallocene catalyst compounds represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of $\eta$-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfuir, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (1) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the graphite support materials may be utilized with the bulky ligand metallocene catalyst compounds of formula (I) where $L^A$ and $L^B$ are bridged to each other by at least one bridging group, A, as represented in the following formula:

$$L^A A L^B MQ_n \qquad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, W096/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C AJMQ_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the graphite support materials may be utilized with the bulky ligand metallocene catalyst compounds represented by the formula:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a uncharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In one embodiment, the graphite support materials may be utilized with the bulky ligand metallocene catalyst compounds represented by the formula:

$$((Z)XA_t(YJ)_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene catalyst compounds include complexes of $Ni^{2+}$ and $Pd^{2+}$ described in the articles Johnson, et al., "New Pd(II)- and Ni(II)- Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene catalysts are those Group 5 and 6 metal imido complexes described in EP-A2-0 816 384 and U.S. Pat. No. 5,851,945, which is incorporated herein by reference. In addition, bulky ligand metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Group 15 Containing Polymerization Catalyst

The graphite support materials may be utilized with Group 15 metal containing polymerization catalyst. Generally, these catalysts includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

Preferably, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

It is also contemplated that any one of the catalyst compounds described above may have at least one fluoride or fluorine containing leaving group as described in U.S. application Ser. No. 09/191,916 filed Nov. 13, 1998.

In another embodiment of the invention the composition containing alternating atoms of Group 14 and Group 16 may be used to create solutions or emulsions including one or more bulky ligand metallocene catalyst compounds, and one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Activator Compositions

The above described polymerization catalyst compounds are typically activated in various ways to yield compounds having a vacant coordination site that will coordinate, insert, and polymerize olefin(s). The catalyst system of the invention may include an activator or activators combined with the graphite support materials.

For the purposes of this patent specification and appended claims, the term "activator" is defined to be any compound which can activate any one of the catalyst compounds described above by converting the neutral catalyst compound to a catalytically active catalyst compound cation. Non-limiting activators, for example, include alumoxanes, aluminum alkyls, and ionizing activators, which may be neutral or ionic.

In one embodiment, alumoxanes activators are utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206, 199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds that may be utilized as activators include trimethylaluminum, triethylaluminum, triisobutylaluminum, tri-n-hexylaluminum, tri-n-octylaluminum and the like.

In another embodiment, the catalyst system of the invention includes an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In another embodiment, the stoichiometric activators include a cation and an anion component, and may be represented by the following formula:

$(L\text{—}H)_d^+(A^{d-})$         (VI)

wherein L is an neutral Lewis base;

H is hydrogen;

$(L\text{—}H)^+$ is a Bronsted acid $A^{d-}$ is a non-coordinating anion having the charge d− d is an integer from 1 to 3.

The cation component, $(L\text{—}H)_d^+$ may include Bronsted acids such as protons or protonated Lewis bases or reducible Lewis acids capable of protonating or abstracting a moiety, such as an akyl or aryl, from the bulky ligand metallocene or Group 15 containing transition metal catalyst precursor, resulting in a cationic transition metal species.

The activating cation $(L\text{—}H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamnine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L\text{—}H)_d^+$ may also be an abstracting moiety such as silver, carboniums, tropylium, carbeniums, ferroceniums and mixtures, preferably carboniums and ferroceniums. Most preferably $(L\text{—}H)_d^+$ is triphenyl carbonium.

The anion component $A^{d-}$ include those having the formula $[M^{k+}Q_n]^{d-}$ wherein k is an integer from 1 to 3; n is an integer from 2–6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

In a most preferred embodiment, the ionic stoichiometric activator $(L\text{—}H)_d^+$ $(A^{d-})$ is N,N-dimethylanilinium tetra (perfluorophenyl)borate or triphenylcarbenium tetra (perfluorophenyl)borate.

Examples of suitable $A^{d-}$ also include diboron compounds as disclosed in U.S. Pat. No. 5,447,895, which is fully incorporated herein by reference.

In one embodiment, an activation method using ionizing ionic compounds not containing an active proton but capable of producing a Group 15 containing metal compound cation or bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4 THF as an activator for a bulky ligand metallocene catalyst compound. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl) borane) benzimidazolide), which are herein incorporated by reference.

Graphite Support Materials

The catalyst system of the invention includes a graphite support material. Typically, catalyst compounds and/or activator compounds are deposited on, contacted with, vaporized with, bonded to, or incorporated within, adsorbed or absorbed in, or on, the support material or carrier.

In one embodiment, the graphite is a powder. In another embodiment the graphite is flake graphite. In another embodiment, the graphite and has a particle size of 1 to about 500 microns, preferably 1 to about 400 microns, more preferably 1 to about 200, more preferably 1 to about 100 microns.

In one embodiment the graphite is a fluorinated graphite. In another embodiment, the graphite fluorinated graphite having a low fluorine content. In another embodiment, the graphite is a fluorinated graphite having a high fluorine content.

Polymerization Process

The catalyst systems of the invention described above are suitable for use in any prepolymnerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the polymerization process of the invention include ethylenically unsaturated monomers, diolefins having 4 to 18 carbon atoms, conjugated or non-conjugated dienes, polyenes, vinyl monomers and cyclic olefins. Non-limiting monomers useful in the invention may include norbomene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a polymerization process.

In another embodiment of the process of the invention, ethylene or propylene is polymerized with at least two different comonomers, optionally one of which may be a diene, to form a terpolymer.

In one embodiment, the invention is directed to a polymerization process for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes, where the siloxane catalyst and/or activator solutions or emulsions of the invention may be utilized, are described in U.S. Pat. Nos. 4,271,060, 5,001,205, 5,236,998 and 5,589,555, which are fully incorporated herein by reference.

A preferred process of the invention is where the process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the catalyst solution or emulsion of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1 to about 40, preferably greater than 1.5 to about 15, more preferably greater than 2 to about 10, most preferably greater than about 2.0 to about 8.

Also, the polymers of the invention typically have a narrow composition distribution as measured by Composition Distribution Breadth Index (CDBI). Further details of determining the CDBI of a copolymer are known to those skilled in the art. See, for example, PCT Pat. Application WO 93/03093, published Feb. 18, 1993, which is fully incorporated herein by reference.

The bulky ligand metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range of from less than 0.01 dg/min to 1000 dg/min, more preferably from about less than 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of about 5 to less than about 2500, preferably about 15 to about 250, more preferably about 10 to about 25, more preferably from about 15 to about 25.

The polymers of the invention in a preferred embodiment have a melt index ratio ($I_{21}/I_2$) ($I_{21}$ is measured by ASTM-D-1238-F) of from preferably greater than 10, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the catalyst systems of the present invention including representative advantages thereof, the following examples are offered.

Definintions

The term, "on the surface" of a support as used herein means that the catalyst compound and/or activator is at either the outer surface or inside the porous support material and/or interacting with the surface of the support through electrostatic interactions.

Solvents in which the catalyst system of the invention are formed can include but are not limited to: alkanes such as pentane, iso-pentane, hexane, heptane, octane, and nonane; cycloalkanes such as cyclopentane and cyclohexanes; aromatics such as benzene, toluene, ethylbenzene, and diethylbenzene; and halogen-containing solvents, such as methylene chloride and dichloromethane.

One of ordinary skill in the art will recognize the use of the phrase "substantially uniform" is meant to exclude wide variations in sizes, while allowing statistical variations, i.e. having a standard deviation of less than about 20%.

The activity of the catalyst system of the invention is compared to that utilizing the same catalyst compound on a silica support material. A silica supported catalyst system is a catalyst system supported on a silica, such as Davisson 958, purchased From Davisson, Columbia, Mass. The preparation of this catalyst system is described in Comparative Example 16.

As used herein, MAO is methylalumoxane, MMAO is modified methylaluminoxane. Cp is cyclopentadiene and Me is methyl. TIBA is triisobutylaluminum, $(Ind)_2ZrCl_2$ is bis(indenyl)zirconium dichloride. Catalyst A and B, referenced in the examples, are pictured below.

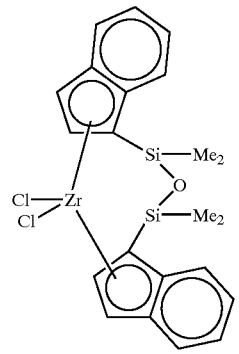

(Catalyst A)

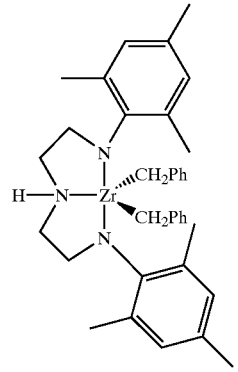

(Catalyst B)

Example 1

General Procedures

All manipulations were carried out in a glove box containing prepurified nitrogen or by using standard schlenk techniques. All solvents were purified by passing through a series of reduced copper chromite and activated alumina beds. Amberchrom and Diaion supports were purchased from Supelco, Inc, Bellefonte, Pa. Controlled pore glasses were obtained from CPG, Inc., Lincoln Park, N.J. Graphite and polytetra-fluoroethylene (PTFE) were obtained from Aldrich Chemical, Milwaukee, Wis. All support materials (except Davison 958 silica) were stirred in 1M triisobutylaluminum solution in pentane for at least 24 hrs, filtered and dried in vacuo prior to catalyst deposition. Methylaluminoxane (MAO) and modified methylaluminoxane (MMAO) were purchased from Akzo Nobel, Houston, Tex. Triisobutylaluminum was purchased from Aldrich Chemical. All catalysts were prepared from previously published procedures well known in the art or purchased from Albemarle Corporation, Baton Rouge, La.

Slurry-Phase Ethylene Polymerization Experiments

The following are procedures currently in use for testing various catalysts in the slurry phase. The basic reactor system consists of a one-liter stainless steel reactor vessel. A purge/evacuation cycle is initiated and the reactor is heated to 95° C. with nitrogen flowing through the reactor at 500 sccm. Once the reactor has reached 95° C., three evacuation-refill cycles are carried out with dry nitrogen. After these cycles, the reactor is cooled to 60° C. under a dry nitrogen purge at 200 sccm. When the reactor has reached a temperature below 60° C., 600 mL of hexane is charged to the reactor through a series of purification beds containing a reduced copper chromite catalyst, 13x molecular sieves and alumina. Once the hexane charge is completed, 1-hexene (43 mL, dried over 13x molecular sieves) and scavenging solution are added consecutively to the reactor through a reactor port. The scavenging solutions used for these experiments were modified methyl aluminoxane (MMAO, 250 equivalents, Type 3A, 1.84 M) and tri-isobutyl aluminum (TIBA, 200 equivalents). The reactor is then heated to 55° C. for at least 10 minutes and is subsequently pressurized with ethylene to the set ethylene partial pressure (85 to 130 psi) (586 to 896 Kpa). The catalyst solution is then charged to the reactor via a pressurized bomb. Polymerization experiments are carried out for periods typically in the 30 to 40 minute range. Polymerization activities are determined from the weight of dried polymer recovered from slurry-phase experiments.

Stirred-Bed Gas-Phase Ethylene Polymerization Experiments

The following are the procedures currently in use for testing various catalysts in the gas-phase. The basic system consists of a one liter stainless steel reactor. To set up an experiment for a gas-phase run, a dip tube connector must be attached to a reactor port before starting the purge/heat cycle. A glass separatory funnel and injector bomb are taken into the glove box under nitrogen pressure. A sample (100 gram) of DSX-4810H polyethylene (starter bed) is weighed into the funnel. After a nitrogen purge cycle, the starter bed is charged to the reactor and three nitrogen purge/evacuation cycles are carried out at 1 minute intervals followed by three ethylene purge/evacuation cycles. When the ethylene purge-evacuation cycles are completed, a 1.00 mL sample of tri-isobutyl aluminum (1000 $\mu$mol) scavenging solution (25% TIBA in hexane) is added to the reactor. The bed is stirred for approximately 10 minutes while the reactor is pressurized with ethylene and brought to the run temperature. The catalyst is injected into the reactor by means of a pressurized bomb injection. Catalyst activities are determined from the volume of ethylene fed as measured by calibrated Brooks mass-flow controllers.

Purification of Commercial Polystyrene Beads

Polystyrene beads were purified according to the procedure of Frechet, J. et. al. *Science* 1998, 280, 270–273. Potassium carbonate (250 g) was weighed into a 1 L beaker and dissolved with vigorous stirring in 500 mL of distilled water. Diaion HP-20SS resin or Amberchrom CG300s resin (200 g) was weighed into a 2 L beaker and slurried in the potassium carbonate solution. The slurry was stirred for 30 minutes and was filtered and washed with distilled water (300 mL). Concentrated hydrochloric acid (150 mL) was then added to 500 mL of water in a 1 L beaker, combined with the resin in a 2 L beaker and then stirred for 30 minutes. The suspension was filtered and washed with distilled water (500 mL). The resin was then stirred in a 2 L beaker with distilled water (500 mL) for 30 minutes. After filtering, the resin was stirred with 600 mL methanol in a 2 L beaker for a period of 30 minutes. The resin was again filtered and washed with 200 mL fresh methanol and transferred to a clean beaker containing a fresh mixture of methanol and methylene chloride (250 mL methanol/75 mL methylene chloride). The suspension was stirred for 30 minutes. After filtration and washing with fresh methanol (100 mL), the resin was transferred to a 2 L beaker containing a mixture of methanol and methylene chloride (120 mL methanol/980 mL methylene chloride). The suspension was stirred for 30 minutes. The suspension was again filtered and was washed with 100 mL of methylene chloride. The resin was stirred in 1500 mL of methylene chloride for a period of 30 minutes and was filtered and transferred to a clean 2 L beaker. The resin was then stirred in a mixture of methanol and methylene chloride (300 mL methanol, 900 mL methylene chloride) for 30 minutes. After filtration, the resin was transferred to a 2 L beaker and 1000 mL of methanol was added. The suspension was stirred for 30 minutes. The suspension was then filtered and washed with 100 mL of fresh methanol. The resin was then transferred into a 1L round bottom flask and vacuum dried on a schlenk line overnight.

Comparative Example 1

Slurry-Phase Ethylene-1-Hexene Copolymerization by $(Ind)_2ZrCl_2$

A catalyst solution was prepared by dissolving solid $(Ind)_2ZrCl_2$ (5.0 milligrams, 12.7 $\mu$mol) in toluene (2.00 mL) and modified methyl aluminoxane (1.10 mL, 150 $\mu$mol, 1.92 M). The catalyst mixture was stirred for 30 minutes. A 100 $\mu$L aliquot (0.86 $\mu$mol) was loaded into the sample portion of the bomb. The catalyst solution was injected into the 1 liter autoclave reactor via the pressurized bomb.

Example 2

Slurry-Phase Ethylene-1-Hexene Copolymerization by $(Ind)_2ZrCl_2$ on CPG 1142 Å Glass Beads A catalyst solution was prepared by dissolving $(Ind)_2ZrCl_2$ (3.37 milligrams, 8.6 $\mu$mol) in a solution of methyl aluminoxane (1.0 mL, type 3A, 13.1 wt. % Al and 4.27M). The catalyst mixture was stirred for 30 minutes. A 200 $\mu$mol aliquot (1.72 $\mu$mol) was loaded onto CPG 1142 Å glass beads (200 mg). The solid mixture was shaken until the catalyst became a free flowing and powder. A 100 mg sample (0.86 $\mu$mol) of the catalyst mixture was placed into a bomb and injected into the 1 liter autoclave reactor.

Comparative Example 3

Slurry-Phase Ethylene-1-Hexene Copolymerization by $(Ind)_2ZrCl_2$ on Davisson 958 Silica A catalyst solution was prepared by dissolving $(Ind)_2ZrCl_2$ (3.37 milligrams, 8.6 $\mu$mol) in a solution of methyl aluminoxane (1.0 mL, type 3A, 13.1 wt. % Al and 4.27M). The catalyst mixture was stirred for 30 minutes. A 100 $\mu$L aliquot (0.86 $\mu$mol) was loaded on Davisson 958 silica support (50 mg). The loaded catalyst was shaken until the catalyst became a free flowing and homogeneous powder. The catalyst mixture was placed into a bomb and injected into the 1 liter autoclave reactor.

Example 4

Slurry-Phase Ethylene-1-Hexene Copolymerization by $(Ind)_2ZrCl_2$ on polytetra-fluoroethylene In a typical procedure, a catalyst solution was prepared by dissolving $(Ind)_2ZrCl_2$ (3.37 milligrams, 8.6 $\mu$mol) in a solution of methyl aluminoxane (1.0 mL, type 3A, 13.1 wt. % Al and 4.27M). The catalyst mixture was stirred for 30 minutes. A 100 $\mu$L aliquot (0.86 $\mu$mol) was loaded onto PTFE support (300 mg). The solid mixture was shaken until the catalyst became a free flowing and homogeneous powder. The catalyst mixture was placed into a bomb and injected into the 1 liter autoclave reactor.

Example 5

Gas-Phase Ethylene Polymerization by $(Ind)_2ZrCl_2$ on Graphite

In a typical example, a catalyst solution was prepared by dissolving the solid $(Ind)_2ZrCl_2$ (3.37 milligrams, 8.6 $\mu$mol) in a solution of methyl aluminoxane (1.00 mL, type 3A, 13.1 wt. % Al and 4.69M). The catalyst mixture was stirred for 30 minutes. A 100 $\mu$L aliquot (0.86 $\mu$mol) was loaded onto a graphite support (200 mg). The loaded catalyst was shaken until the catalyst became a free flowing and homogeneous powder. The catalyst mixture (0.86 µmol) was placed into a bomb and injected into the 1 liter autoclave reactor.

Example 6
Slurry-Phase Ethylene Polymerization by Catalyst A on onto Diaion Polystyrene A catalyst solution was prepared by dissolving tetramethylbisindenylsiloxane zirconium dichloride (24.5 mg) in 1.0 mL of MAO (4.62M solution in toluene). The catalyst mixture was stirred for 60 minutes. A 200 µL aliquot was removed and loaded onto 200 mg of controlled pore glass. The loaded catalyst was shaken until it became a free flowing and homogeneous powder and was loaded into a bomb and injected into the 1 L autoclave reactor.

Example 7
Polymerizaiton Activity of Various MAO-Activated Substrates on Inert Supports Table 5 shows the activities of bis(indenyl)zirconium dichloride catalyst absorbed into other supports of Examples 15 to 18. The activities of the catalysts absorbed into graphite were in the range of 10,000–50,000 g PE (mmol Zr)$^{-1}$(100 psi)$^{-1}$ h$^{-1}$, somewhat less than the unsupported catalyst, but clearly better than the activity of the Davisson 958 silica supported catalyst. Graphite can also be used as a vehicle for solution catalyst delivery. Four different graphitic materials were examined: granular and flaked graphites and fluorinated graphites containing high and low fluorine contents. All the graphitic materials showed acceptable activity, in the range of 47,000–54,000 g PE (mmol Zr)$^{-1}$ (100 psi)$^{-1}$ h$^{-1}$, 1.5–2 times that of the silica supported catalyst system.

TABLE 5

Polymerization activity of various MAO-activated substrates on inert supports

| Example | Catalyst | Al/Zr | Support Type | Number of Runs | Activity |
|---|---|---|---|---|---|
| Comp. 1 | (Ind)$_2$ZrCl$_2$ | 500 | none | 2 | 101519 |
| 2 | (Ind)$_2$ZrCl$_2$ | 500 | 1142A CPG | 5 | 74598 |
| Comp. 3 | (Ind)$_2$ZrCl$_2$ | 500 | 958 silica | 1 | 29959 |
| 4 | (Ind)$_2$ZrCl$_2$ | 500 | PTFE (1 µm) | 2 | 10814 |
| 4 | (Ind)$_2$ZrCl$_2$ | 500 | PTFE (55 µm) | 1 | 49248 |
| 5 | (Ind)$_2$ZrCl$_2$ | 500 | 1–2 µm graphite | 2 | 50263 |
| 5 | (Ind)$_2$ZrCl$_2$ | 500 | low fluorinated graphite | 2 | 54135 |
| 5 | (Ind)$_2$ZrCl$_2$ | 500 | high fluorinated graphite | 2 | 47526 |
| 5 | (Ind)$_2$ZrCl$_2$ | 500 | flake graphite | 1 | 48728 |
| 6 | AN | 200* | none | 1 | 19833 |
| 6 | AN | 200 | 1142A CPG | 3 | 7642 |

*reference run performed with MMAO Type 3 as cocatalyst

We claim:

1. A process for polymerizing olefins utilizing a catalyst system, comprising: a graphite support material, a catalyst compound, and an activator compound, said activator compound selected from one of alumoxanes, aluminum alkyls, or ionizing activators.

2. The process of claim 1, wherein the graphite support material further comprises surface functionality.

3. The process of claim 2, wherein the surface functionality is selected from the group consisting of amines, azides, alkylamines, thiols, alkylthiols, alcohols, diols, carboxylic acids, and combinations thereof.

4. The process of claim 1 wherein the catalyst compound is a bulky ligand metallocene catalyst compound.

5. The process of claim 1 wherein the catalyst compound is a Group 15 containing metal catalyst compound.

6. The process of claim 1 wherein the activator compound is selected from the group consisting of methylalumoxane, modified methylalumoxane, ethylalumoxane, isobutylalumoxane, and combinations thereof.

7. The process of claim 1 wherein the activator compound is a stoichiometric activator.

8. The process of claim 1 wherein the polymerization process is a gas phase process.

9. The process of claim 1 wherein the polymerization process is a slurry phase process.

10. A catalyst system comprising a graphite support material, a catalyst compound, and an activator compound, said activator compound selected from one of alumoxanes, aluminum alkyls, or ionizing activators.

11. The catalyst system of claim 10, wherein the graphite support material further comprises surface functionality.

12. The catalyst system of claim 11, wherein the surface functionality is selected from the group consisting of amines, azides, alkylamines, thiols, alkylthiols, alcohols, diols, carboxylic acids, and combinations thereof.

13. The catalyst system of claim 10 wherein the catalyst compound is a bulky ligand metallocene catalyst compound.

14. The catalyst system of claim 10 wherein the catalyst compound is a Group 15 containing metal catalyst compound.

15. The catalyst system of claim 10 wherein the activator compound is selected from the group consisting of methylalumoxane, modified methylalumoxane, ethylalumoxane, isobutylalumoxane, and combinations thereof.

16. The catalyst system of claim 10 wherein the activator compound is a stoichiometric activator.

17. A method of making a supported catalyst system, the method comprising the steps of:

a) combining a catalyst compound with an activator compound, said activator compound selected from one of alumoxanes, aluminum alkyls, or ionizing activators, to form an activated catalyst compound; and b) combining the activated catalyst compound with a graphite support material.

18. The method of claim 17 wherein the catalyst compound is selected from the group consisting of a bulky ligand metallocene catalyst compound, a Group 15 containing metal catalyst compound, and combinations thereof.

19. The method of claim 17 wherein the activator compound is selected from the group consisting of methylalumoxane, modified methylalumoxane, ethylalumoxane, isobutylalumoxane, a stoichiometric activator compouund, and combinations thereof.

* * * * *